Sept. 15, 1942.     A. D. REID     2,296,222
VEHICLE SIGNAL SYSTEM AND SWITCH
Filed July 3, 1940
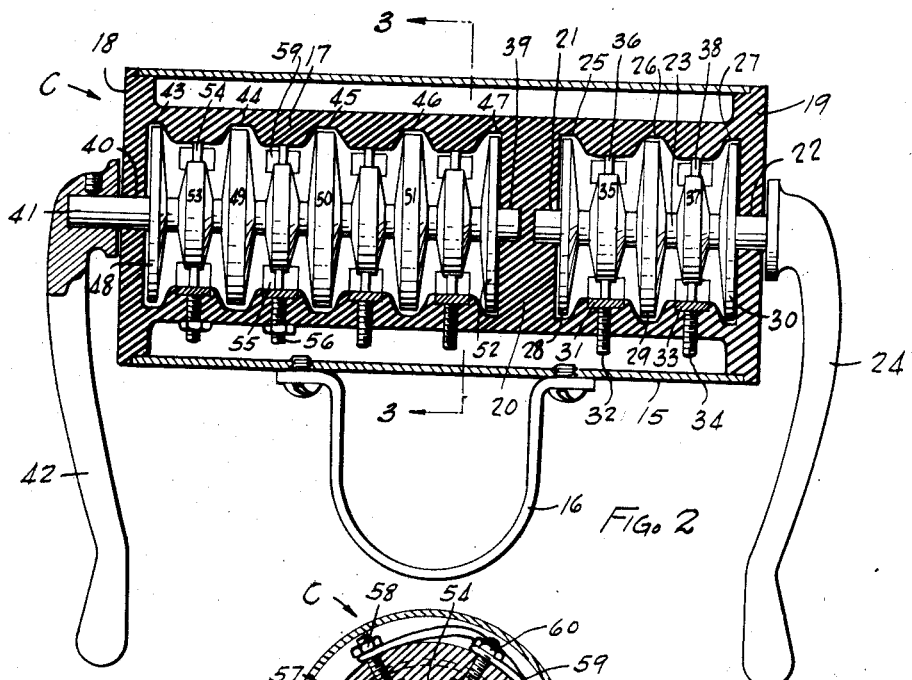
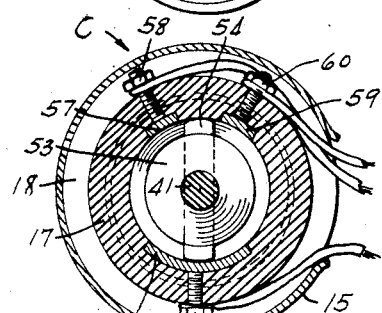
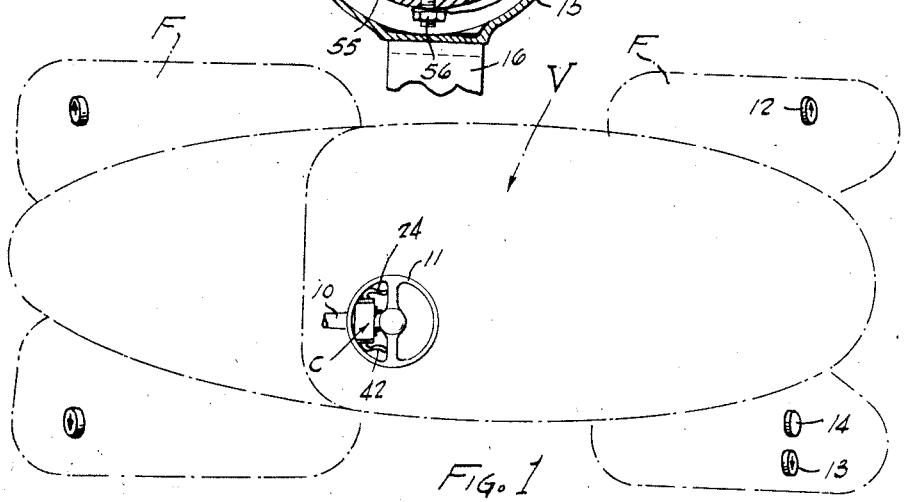
INVENTOR.
ALBERT D. REID.
BY Joshua R. H. Potts
ATTORNEY.

Patented Sept. 15, 1942

2,296,222

UNITED STATES PATENT OFFICE 2,296,222

VEHICLE SIGNAL SYSTEM AND SWITCH

Albert D. Reid, West Chester, Pa.

Application July 3, 1940, Serial No. 343,753

2 Claims. (Cl. 200—59)

This invention relates to signal devices such as are included in motor vehicles for the purpose of enabling the operator to indicate to other drivers his immediate future actions.

The invention has in view, as its foremost objective, the provision of a signal device of the character above noted which includes, as a characteristic element, a control switch that is conveniently mounted on the steering column beneath the steering wheel.

More in detail the invention has, as an object, the provision of a control switch including a pair of double operating members, there being an operating member at each side of the control switch. One of these members is intended to be operated to signal a right-hand turn, as by controlling lights on the right-hand fenders of the vehicle, while the other operating member will control the lighting of signal lights on the left-hand side of the vehicle.

Important objects and advantages of the invention are associated with the provision of a control switch made in accordance with the above noted objectives, and which control switch will include suitable circuit controls for lighting appropriate signal lights as occasion demands. These will in part become apparent, and in part be hereinafter stated, as the description of the invention proceeds.

The invention, therefore, comprises a signal device for motor vehicles which consists of appropriate signal lights mounted on the fenders of the vehicle. These lights are included in circuits which are controlled by a control switch mounted on the steering column at a point conveniently located beneath the steering wheel. The control switch includes a pair of independent operating members, one designed for controlling the right-hand lights, and the other the left-hand lights.

For a full and more complete understanding of the invention, reference may be had to the following description and accompanying drawing, wherein Figure 1 is a plan view, largely diagrammatic, of a motor vehicle in which the signal device of this invention has been incorporated, Figure 2 is a horizontal section through the control switch, and Figure 3 is a vertical section taken about on the plane represented by the line 3—3 of Figure 2.

Referring now to the drawing, wherein like reference characters denote corresponding parts, a motor vehicle is depicted diagrammatically in Figure 1 by the broken lines, and is referred to in its entirety by the reference character V.

The vehicle V includes the usual steering column 10, which carries at the top a steering wheel 11. The vehicle V also includes the usual fenders F, and it will be noted that the fenders F on the right-hand side of the car each carry a signal light 12. Each of these signal lights 12 may include an arrow or pointer, as illustrated, pointing in the right-hand direction so that when the light is lit it will indicate to other drivers that the driver of that particular vehicle is making a right-hand turn.

The fenders F on the left-hand side of the car each include a signal light 13, which correspond to the signal lights 12, and which carry arrows or pointers pointing to the left, thus indicating the making of a left-hand turn. The rear left-hand fender also includes a signal light 14 which is intended to be of a green color, and when lit will indicate to drivers in the rear that they should pass the car on which the green light appears.

A control switch referred to in its entirety by the reference character C is mounted on the steering column 10 beneath the wheel 11. This control switch C is shown in detail in Figures 2 and 3, and comprises a cylindrical casing 15 which may be mounted on the steering column 10 in any preferred manner, such as by the bracket represented at 16.

Included within the casing 15 is the main body member of the switch, which, as illustrated, is of general tubular formation, and which is made from an appropriate insulating material. This main body member is designated 17, and carries, at its ends, heads 18 and 19 which function as end closures for the casing 15. The member 17 also includes a partition member 20 which divides the member 17 into two sections.

The right-hand side of the partition member 20 is formed with a socket 21, while the head 19 is formed with an opening 22, the socket 21 and opening 22 providing bearing for a shaft 23 of a switch rotor. Exteriorally of the head 19 the shaft 22 carries an operating lever 24, which is intended to be conveniently accessible to the right-hand of the driver of the vehicle.

The inner bore of the body member 17, on the right-hand side of the partition 20, is formed with three annular grooves 25, 26 and 27, which receive guide disks 28, 29 and 30, respectively, that are carried on the rotor shaft 23. Between the grooves 25 and 26 there is defined a ribbed or raised structure in which is mounted a contact 31 that is conductively connected to a binding post 32.

There is a similar raised or ribbed structure between the grooves 26 and 27, and this structure carries another contact 33 that is conductively connected to a binding post 34.

The binding posts 32 and 34 are connected by appropriate wiring with the lights 12 on the right-hand fenders, and it will be noted that there is a pair of contacts diametrically oppositely disposed to contact 31 and binding post 32 in the ribbed structure between grooves 25 and 26, and, similarly, there is a pair of contacts diametrically oppositely disposed to contact 33 and binding post 34. When the elements of each opposite pair are conductively connected the circuit is complete and the lights are on, but when the elements of each opposite pair of contacts are unconnected, the circuit is broken.

The shaft 23 carries a hub member 35 disposed substantially oppositely to the raised structure between grooves 25 and 26, and extending through this hub structure 35 is a conducting strip 36 the ends of which project beyond the hub 35. One of these projecting ends at all times engages one of the contacts 31. In one position the other end engages the other contact 31 to complete the circuit, but the shaft 23 may be rotated under the influence of the operating lever 34 to bring this end out of engagement with the contact 31 and break the circuit.

Similarly there is a hub member 37 on the shaft 23 oppositely to the raised portion between the grooves 26 and 27, and this hub member 37 carries a conducting strip 38 the ends of which project beyond the hub member 37 to engage the contacts 33 in the manner above described in connection with the hub 35 and connecting strip 36.

The left-hand side of the partition 20 is formed with a socket 39, while the head 18 is formed with an opening 40. A shaft 41 is rotatably mounted in the socket 39 and opening 40, and carries, exteriorally of the head 18, an operating lever 42. The inner bore of the body member 17 between head 18 and partition 20 is formed with annular grooves 43, 44, 45, 46 and 47, which define therebetween ribbed or raised portions. The shaft 41 carries guide disks 48, 49, 50, 51 and 52 which are received in the grooves 43, 44, 45, 46 and 47, respectively. The shaft 41 also carries a hub member 53 which is disposed oppositely to the raised portion between each of the grooves. Thus there are four hub members 53 between the guide disks 48, 49, 50, 51 and 52.

Extending through each of the hub members 53 is a conducting strip 54 the extremities of which project therebeyond. Each raised portion that is defined between the grooves carries three contact elements, the relative arrangement of which is clearly brought out in Figure 3. Thus there is a large contact 55 that is intended at all times to be engaged by one end of the conducting strip 54.

Conductively associated with the contact 55 is a binding post 56. Another contact 57 has a binding post 58 associated therewith, and this contact 57 is of appreciably less extent than the contact 55. There is another contact 59 corresponding to the contact 57, and associated with the contact 59 is a binding post 60.

The switch provided by the contacts 55, 57 and 59 and conducting strip 54 is of the commutator type, and is intended to control two circuits. One of these circuits includes the lights 13 on the left-hand fender, while the other circuit controls the "go ahead" light 14 on the rear left-hand fender. Either of these circuits may be completed to the exclusion of the other. Thus with the conducting strip 54 in the full line position depicted in Figure 3 neither circuit is completed, and both sets of lights are off.

However, if the conducting strip 54 is moved in a counterclockwise direction, so that the upper end engages the contact 57, the circuit of this contact will be completed, as the lower end is in engagement with the contact 55. On the other hand, if the conducting strip 54 is rotated in a clockwise direction the upper end thereof engages the contact 59 to complete the other circuit. It is obvious that this rotation of the conducting strip is effected by the operator, who will avail of the lever 42 for this purpose.

While preferred specific embodiments of the invention are hereinbefore set forth it is to be clearly understood that the invention is not to be limited to the exact constructions illustrated and described, because various modifications of these details may be provided in putting the invention into practice within the purview of the appended claims.

I claim:

1. A vehicle signal switch comprising a main body formed of insulation material provided with a longitudinal bore, axially spaced and inwardly extending ribs carried by the wall of said bore and forming axially spaced grooves, a rotor of insulation material arranged for rotative movement in said bore, a guide disc carried by said rotor for each of said grooves and arranged to provide axially spaced chambers insulated from each other, a hub disc member carried by said rotor in and for each of said chambers, oppositely disposed contact members carried by the wall of said bore in each of said chambers, a conducting element carried by each of said hub disc members and arranged to complete a circuit between oppositely disposed contact members, an actuating lever carried by said rotor, and binding posts secured to each of said contact members and arranged for connection to external electrical conductors.

2. A vehicle signal switch comprising a main body formed of insulation material provided with a longitudinal bore, axially spaced and inwardly extending ribs carried by the wall of said bore and forming axially spaced grooves, a rotor of insulation material arranged for rotative movement in said bore, a guide disc carried by said rotor for each of said grooves and arranged to provide axially spaced chambers insulated from each other, a hub disc member carried by said rotor in and for each of said chambers, oppositely disposed contact members carried by the wall of said bore in each of said chambers, a conducting element carried by each of said hub disc members and arranged to complete a circuit between oppositely disposed contact members, an actuating lever carried by said rotor, binding posts secured to each of said contact members, and arranged for connection to external electrical conductors, and spaced bearing members carried by said main body for supporting said rotor in axial relation to said bore.

ALBERT D. REID.